Nov. 11, 1924.                                                                      1,515,115
S. ISAACSON
STORAGE BATTERY CONTAINER
Filed April 13, 1922

Sidney Isaacson
Inventor

By his Attorney

Patented Nov. 11, 1924.

1,515,115

UNITED STATES PATENT OFFICE.

SIDNEY ISAACSON, OF NEW YORK, N. Y.

STORAGE-BATTERY CONTAINER.

Application filed April 13, 1922. Serial No. 552,206.

*To all whom it may concern:*

Be it known that SIDNEY ISAACSON, citizen of the United States, residing at the city of New York, in the county of New York and State of New York, has invented certain new and useful Improvements in Storage-Battery Containers, of which the following is a specification.

This invention relates to storage battery containers. One object thereof is to provide a container which shall make it possible to assemble the various elements of a small storage battery adapted for use in amateur electrical work such as radio-phones and the like, in the form of a very compact and portable article which may be easily packed for shipment, carried from place to place and shall occupy comparatively small space when installed.

Other objects of this invention will in part be obvious and in part hereinafter set forth.

The invention accordingly consists in the features of construction, combinations of elements and arrangement of parts which will be exemplified in the construction hereinafter described and of which the scope of application will be indicated in the following claim.

In the accompanying drawings, in which is shown one of various possible illustrative embodiments of this invention.

Figure 1:
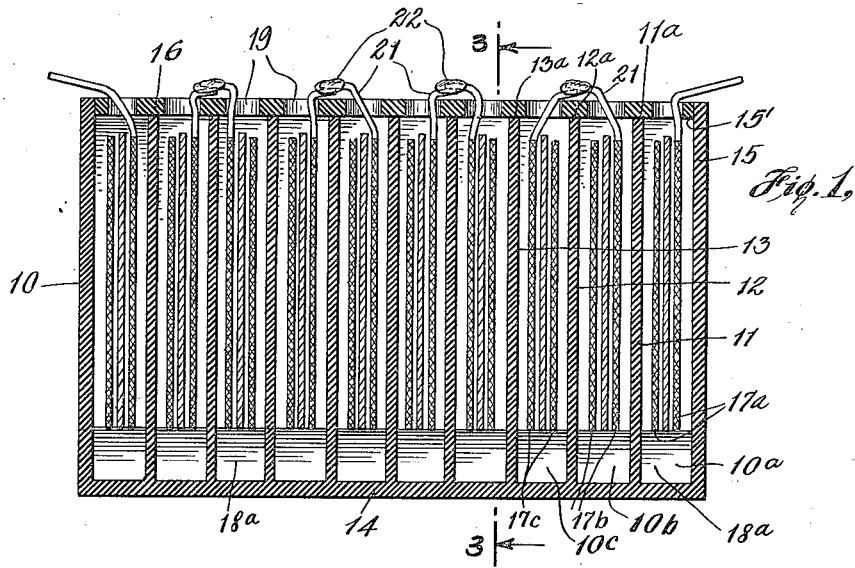
Fig. 1 is a vertical cross-sectional view of a storage battery container embodying my invention shown with the plates in position in the cells.
Figure 2:
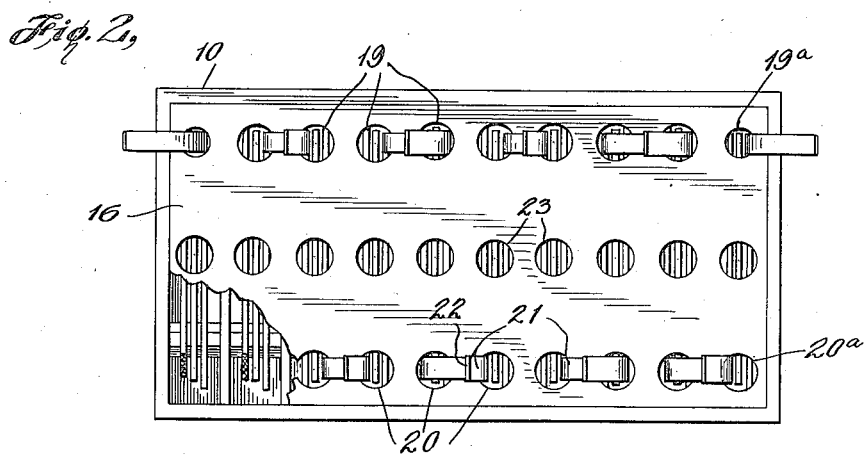
Fig. 2 is a plan view partially broken away of the container shown in Fig. 1.
Figure 3:
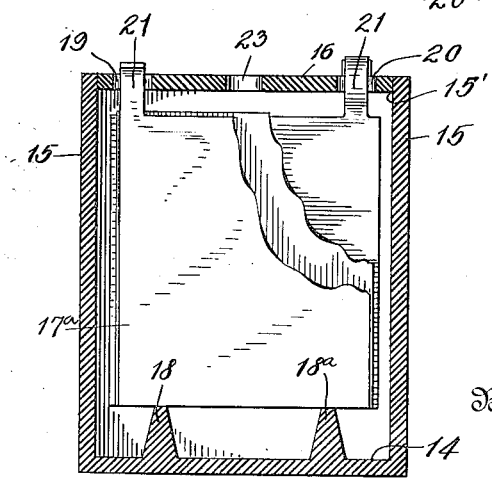
Fig. 3 is an end cross-sectional view through one compartment cut along line 3—3 of Fig. 1

Referring in detail to the drawing, 10 indicates a container made from acid resisting material such as hard rubber or the like material, and having separate compartments or cells $10^a$, $10^b$, $10^c$ . . . formed by the vertical partitions 11, 12, 13 . . . These partitions are preferably formed integral with the container and extend upwardly from the bottom 14 thereof to within a short distance from the top of the vertical walls 15 of the container. A space $15'$ is thus provided wherein snugly fits a cover member 16. The latter is adapted to rest on the tops $11^a$, $12^a$, $13^a$ of the partitions 11, 12, 13 with its upper face substantially flush with the top of the container as will be readily understood. The battery plates $17^a$, $17^b$, $17^c$ rest on supports 18, $18^a$, upstanding from the bottom of the container and preferably formed integral therewith.

A pair of rows of spaces openings 19, 20 is provided in the cover so as to communicate with the separate cells. Each pair of such openings such as $19^a$, $20^a$ communicates with its corresponding cell $10^a$ as will be readily understood. Electrical connection of the battery plates is thus very easily effected, the terminals 21 for the plates extending through said openings and being suitably connected as desired at the top of the cover 16 as shown at 22.

Centrally disposed on the cover is an intermediate row of openings 23, each of which communcates with a corresponding cell, thus providing means for filling each separate cell with the electrolyte or for emptying each cell as desired without removing the cover or disconnecting the plates.

It will thus be seen that there is provided a device in which the several objects of this invention are achieved and which is well adapted to meet the conditions of practical use.

As various possible embodiments might be made of the above invention and as various changes might be made in the embodiment above set forth, it is to be understood that all matter herein set forth or shown in the accompanying drawings is to be interpreted as illustrative and not in a limiting sense.

Having thus described my invention, I claim as new and desire to secure by Letters Patent:—

A storage battery container comprising a unitary construction having a body consisting of a bottom, side walls and end walls formed integral with said bottom, transverse partitions arranged integral with the bottom and side walls of the body and extending upwardly from the bottom to points below the upper ends of said walls, said partitions dividing the interior of the body into a plurality of non-communicating cells adapted to contain battery plates, longitudinal ribs formed integral with and upstanding from the bottom between the partitions and adapted to support battery plates within the body, and a one-piece cover extending over the entire open end of said body for closing all of said cells, resting for support on said partitions and having its edges engaging the inner surfaces of said walls, the upper surfaces of the cover being substantially flush with the upper edges of said walls, said cover being provided with pairs of openings corresponding with each cell and adapted to permit the free passages of the leads of the plates in one cell to the exterior for connection to the leads in the other cells, said cover being also provided with a series of openings communicating with said cells wherethrough the latter may be filled with electrolyte.

In testimony whereof I affix my signature

SIDNEY ISAACSON.